United States Patent
Xiong et al.

(10) Patent No.: US 10,980,008 B2
(45) Date of Patent: Apr. 13, 2021

(54) DETERMINING RESOURCES FOR UPLINK CONTROL INFORMATION ON PHYSICAL UPLINK SHARED CHANNEL AND PHYSICAL UPLINK CONTROL CHANNEL WITH FREQUENCY HOPPING

(71) Applicant: Apple Inc., Cupertino, CA (US)

(72) Inventors: Gang Xiong, Portland, OR (US); Yushu Zhang, Beijing (CN); Ajit Nimbalker, Fremont, CA (US); Joonyoung Cho, Portland, OR (US)

(73) Assignee: Apple Inc., Cupertino, CA (US)

( * ) Notice: Subject to any disclaimer, the term of this patent is extended or adjusted under 35 U.S.C. 154(b) by 26 days.

(21) Appl. No.: 16/213,919

(22) Filed: Dec. 7, 2018

(65) Prior Publication Data

US 2019/0116588 A1   Apr. 18, 2019

Related U.S. Application Data

(60) Provisional application No. 62/596,268, filed on Dec. 8, 2017, provisional application No. 62/615,883, filed on Jan. 10, 2018, provisional application No. 62/637,732, filed on Mar. 2, 2018.

(51) Int. Cl.
| | |
|---|---|
| *H04W 72/04* | (2009.01) |
| *H04L 1/18* | (2006.01) |
| *H04L 5/00* | (2006.01) |
| *H04L 1/16* | (2006.01) |
| *H04W 88/02* | (2009.01) |

(52) U.S. Cl.
CPC ....... *H04W 72/0413* (2013.01); *H04L 1/1671* (2013.01); *H04L 1/1812* (2013.01); *H04L 1/1861* (2013.01); *H04L 5/0007* (2013.01); *H04L 5/0012* (2013.01); *H04L 5/0048* (2013.01); *H04L 5/0055* (2013.01); *H04L 5/0057* (2013.01); *H04L 5/0044* (2013.01); *H04W 88/02* (2013.01)

(58) Field of Classification Search
CPC .......................... H04W 72/0413; H04W 88/02
See application file for complete search history.

(56) References Cited

U.S. PATENT DOCUMENTS

| | | | | |
|---|---|---|---|---|
| 2014/0192843 | A1* | 7/2014 | Zeng | H04B 1/713 |
| | | | | 375/135 |
| 2019/0045498 | A1* | 2/2019 | Huang | H04B 1/713 |
| 2020/0112397 | A1* | 4/2020 | Park | H04W 72/1268 |

* cited by examiner

*Primary Examiner* — Kevin C. Harper
*Assistant Examiner* — Derrick V Rose
(74) *Attorney, Agent, or Firm* — Sterne, Kessler, Goldstein & Fox P.L.L.C.

(57) ABSTRACT

Described is an apparatus of a User Equipment (UE) operable to communicate with an Evolved Node-B (eNB) on a wireless network. The apparatus may comprise a first circuitry and a second circuitry. The first circuitry may be operable to allocate a first set of Resource Elements (REs) for a set of Uplink Control Information (UCI) types corresponding with a first set of frequency resources. The first circuitry may also be operable to allocate a second set of REs for the set of UCI types corresponding with a second set of frequency resources. The second circuitry may be operable to prepare one or more Physical Uplink Shared Channel (PUSCH) transmissions comprising the first set of REs and the second set of REs. A number of REs in the first set of REs may be different than a number of REs in the second set of REs.

20 Claims, 4 Drawing Sheets

DETERMINING RESOURCES FOR UPLINK CONTROL INFORMATION ON PHYSICAL UPLINK SHARED CHANNEL AND PHYSICAL UPLINK CONTROL CHANNEL WITH FREQUENCY HOPPING

CLAIM OF PRIORITY

The present application claims priority under 35 U.S.C. § 119 to U.S. Provisional Patent Application Ser. No. 62/596,268 filed Dec. 8, 2017 and entitled "MECHANISMS FOR DETERMINING RESOURCES FOR UPLINK CONTROL INFORMATION (UCI) ON PHYSICAL UPLINK CONTROL CHANNEL (PUCCH) AND PHYSICAL UPLINK SHARED CHANNEL (PUSCH) WITH FREQUENCY HOPPING," and to U.S. Provisional Patent Application Ser. No. 62/615,883 filed Jan. 10, 2018 and entitled "MECHANISMS FOR DETERMINING RESOURCES FOR UPLINK CONTROL INFORMATION (UCI) ON PHYSICAL UPLINK CONTROL CHANNEL (PUCCH) AND PHYSICAL UPLINK SHARED CHANNEL (PUSCH) WITH FREQUENCY HOPPING," and to U.S. Provisional Patent Application Ser. No. 62/637,732 filed Mar. 2, 2018 and entitled "MECHANISMS FOR DETERMINING RESOURCES FOR UPLINK CONTROL INFORMATION (UCI) ON PHYSICAL UPLINK CONTROL CHANNEL (PUCCH) AND PHYSICAL UPLINK SHARED CHANNEL (PUSCH) WITH FREQUENCY HOPPING," which are herein incorporated by reference in their entirety.

BACKGROUND

A variety of wireless cellular communication systems have been implemented, including a 3rd Generation Partnership Project (3GPP) Universal Mobile Telecommunications Systems (UMTS) system, a 3GPP Long-Term Evolution (LTE) system, and a 3GPP LTE-Advanced (LTE-A) system. Next-generation wireless cellular communication systems based upon LTE and LTE-A systems are being developed, such as a Fifth Generation (5G) wireless system/5G mobile networks system. Some next-generation wireless cellular communication systems may support intra-slot frequency-hopping.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Various wireless cellular communication systems have been implemented or are being proposed, including 3rd Generation Partnership Project (3GPP) Universal Mobile Telecommunications Systems (UMTS), 3GPP Long-Term Evolution (LTE) systems, 3GPP LTE-Advanced (LTE-A) systems, and 5th Generation (5G) wireless systems/5G mobile networks systems/5G New Radio (NR) systems.

Mobile communication has evolved significantly from early voice systems to today's highly sophisticated integrated communication platforms. Next-generation wireless communication systems (e.g., 5G systems and/or NR systems) may provide access to information and sharing of data at a wide variety of places and times, and by various users and applications. NR may provide a unified network and/or system targeted to meet different and sometimes conflicting performance dimensions and services. Such diverse multi-dimensional requirements may be driven by different services and applications. In general, NR may evolve from 3GPP LTE-A, and may be enhanced by additional potential new Radio Access Technologies (RATs) to provide better, simpler, and more seamless wireless connectivity solutions. NR may accordingly enable ubiquitous wireless connectivity and may enable delivery of fast and rich content and services.

For NR, Uplink Control Information (UCI) may include one or more of: a Scheduling Request (SR) indicator, a Hybrid Automatic Repeat Request Acknowledgement (HARQ-ACK) feedback indicator, a Channel State Information (CSI) report, e.g., a Channel Quality Indicator (CQI), a Pre-coding Matrix Indicator (PMI), a CSI Resource Indicator CRI), a Rank Indicator (RI), and/or beam related information (e.g., a Layer 1 Reference Signal Received Power (L1-RSRP)).

Furthermore, UCI may be carried by either a Physical Uplink Shared Channel (PUSCH) transmission or a Physical Uplink Control Channel (PUCCH) transmission. In some cases in which frequency hopping is enabled for PUSCH, a number N1 of modulation symbols of a HARQ-ACK may be partitioned into a HARQ-ACK part A and a HARQ-ACK part B, where part A may have a floor of a number (N1/2) of modulation symbols and part B may have a ceiling of a number (N1/2) of modulation symbols. HARQ-ACK part A may be mapped to a first frequency hop, and HARQ-ACK part B may be mapped to a second frequency hop.

In some cases in which frequency hopping is enabled for PUSCH, a number N2 of modulation symbols of a CSI part 1 may be partitioned into a CSI part 1A and a CSI part 1B, where part 1A has a floor of a number (N2/2) of modulation symbols and part 1B has a ceiling of a number (N2/2) of modulation symbols. CSI part 1A may be mapped to the first frequency hop, and CSI part 1B may be mapped to the second frequency hop.

In some cases in which frequency hopping is enabled for PUSCH, a number N3 of modulation symbols of a CSI part 2 may be partitioned into a CSI part 2A and a CSI part 2B, where part 2A has a floor of a number (N3/2) of modulation symbols and part 2B has a ceiling of a number (N3/2) of modulation symbols. CSI part 2A may be mapped to the first frequency hop, and CSI part 2B may be mapped to the second frequency hop.

Furthermore, for long PUCCH with a length N within a slot, in cases of frequency hopping, a number of symbols in the first frequency hop may be a floor of a number (N/2), and a number of symbols in the second frequency hop may be a ceiling of a number (N/2). Note that a similar mechanism may be applied for intra-slot frequency hopping for PUSCH.

In cases of HARQ-ACK and CSI report on PUSCH, or CSI report only on PUSCH, a total number of symbols for HARQ-ACK feedback and CSI report in a first frequency hop may be (and/or may be bounded by) the floor of the number (N1/2)+the floor of the number (N2/2)+the floor of the number (N3/2), while a total number of symbols for HARQ-ACK feedback and CSI report may be (and/or may be bounded by) the ceiling of the number (N1/2)+the ceiling of the number (N2/2)+the ceiling of the number (N3/2). In some embodiments, this may indicate roughly equal splits of HARQ-ACK feedback and CSI report in the two frequency hops.

However, when the number of symbols for PUSCH is odd, the number of symbols for different hops—and hence the number of Resource Elements (RE) for different hops—may differ by one Orthogonal Frequency Division Multiplexing (OFDM) symbol. In such cases, some of the resources in the second frequency hop might not be used or may be left empty, which may not be desirable in terms of spectrum efficiency.

Accordingly, if HARQ-ACK is present for transmission on PUSCH, the HARQ-ACK part A (referred to herein as $G^{ACK}(1)$) and the HARQ-ACK part B (referred to herein as $G^{ACK}(2)$) may be determined in accordance with the equations:

$$G^{ACK}(1)=N_L \cdot Q_m \cdot \lfloor G^{ACK}/(2 \cdot N_L \cdot Q_m) \rfloor$$

$$G^{ACK}(2)=N_L \cdot Q_m \cdot \lceil G^{ACK}/(2 \cdot N_L \cdot Q_m) \rceil$$

Additionally, if CSI is present for transmission on the PUSCH, the CSI part 1A (referred to herein as $G^{CSI\text{-}part1}(1)$), the CSI part 1B (referred to herein as $G^{CSI\text{-}part1}(2)$), the CSI part 2A (referred to herein as $G^{CSI\text{-}part2}(1)$), and the CSI part 2B (referred to herein as $G^{CSI\text{-}part1}(1)$) may be determined in accordance with the equations:

$$G^{CSI\text{-}part1}(1)=N_L \cdot Q_m \cdot \lfloor G^{CSI\text{-}part1}/(2 \cdot N_L \cdot Q_m) \rfloor$$

$$G^{CSI\text{-}part1}(2)=N_L \cdot Q_m \cdot \lceil G^{CSI\text{-}part1}/(2 \cdot N_L \cdot Q_m) \rceil$$

$$G^{CSI\text{-}part2}(1)=N_L \cdot Q_m \cdot \lfloor G^{CSI\text{-}part2}/(2 \cdot N_L \cdot Q_m) \rfloor$$

$$G^{CSI\text{-}part2}(2)=N_L \cdot Q_m \cdot \lceil G^{CSI\text{-}part2}/(2 \cdot N_L \cdot Q_m) \rceil$$

To address this, in cases in which intra-slot frequency hopping is applied, the number of symbols for HARQ-ACK, CSI part 1, and CSI part 2 may be unevenly divided into two partitions, in order to match with the number of OFDM symbols in each hop.

Disclosed herein are mechanisms and methods for determining resources for UCI on PUCCH and/or PUSCH in cases of frequency hopping. Some embodiments may pertain to mechanisms and methods of determining resources for UCI on PUSCH with frequency hopping. Some embodiments may pertain to mechanisms and methods of determining resources for UCI on PUCCH with frequency hopping.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a 5G-capable or NR-capable eNB, an Access Point (AP), and/or another base station for a wireless communication system. The term "gNB" may refer to a 5G-capable or NR-capable eNB. For purposes of the present disclosure, the term "UE" may refer to a legacy LTE capable User Equipment (UE), a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, OFDM symbols, subcarrier frequencies, REs, and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

Figure 1:
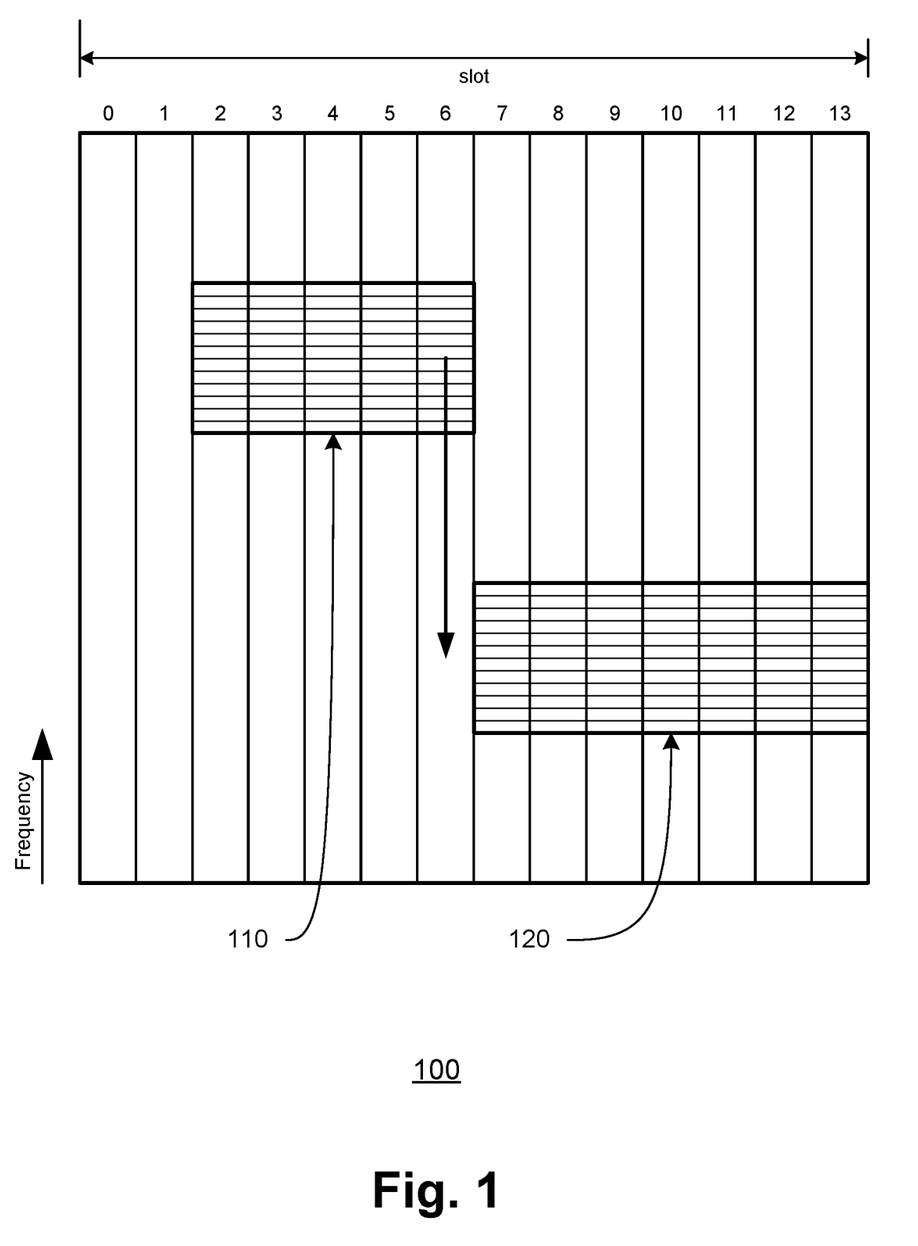
FIG. 1 illustrates a scenario of frequency hopping, in accordance with some embodiments of the disclosure.

FIG. 1 illustrates a scenario of frequency hopping, in accordance with some embodiments of the disclosure. In a scenario 100, for a frequency-hopping pattern, a system bandwidth may be used by one or more UE devices which may hop from one frequency band to another frequency band over time. In some embodiments, a UE may hop from one frequency band to another frequency band within a slot (such as within a resource block, or otherwise over a set of OFDM symbols).

A UE in scenario 100 may accordingly hope from a first band of frequencies to a second band of frequencies. The UE may prepare and transmit a first set of REs 110 at the first set of frequencies and may prepare and transmit a second set of REs 120 at a second set of frequencies. The UE may thus prepare and transmit the first set of REs 110 over a first set of OFDM symbols, and may prepare and transmit the second set of REs 120 over a second set of OFDM symbols.

As discussed herein, in some embodiments, the first set of REs 110 and/or the second set of REs 120 may comprise or pertain to PUSCH transmissions. For some embodiments, the first set of REs 110 and/or the second set of REs 120 may comprise or pertain to PUCCH transmissions.

A variety of embodiments may pertain to mechanisms and methods of determining resources for UCI on PUSCH with frequency hopping. For UCI on PUSCH with intra-slot frequency hopping, a total number of symbols for HARQ-ACK feedback and CSI report in a first frequency hop may be a floor of a number (N1/2)+a floor of a number (N2/2)+a floor of a number (N3/2), while a total number of symbols for HARQ-ACK feedback and CSI report in a second frequency hop may be a ceiling of a number (N1/2)+a ceiling of a number (N2/2)+a ceiling of a number (N3/2), where N1, N2, and N3 are the total numbers of modulated symbols for HARQ-ACK feedback, CSI part 1, and CSI part 2, respectively. This may correspond with a roughly equal split of HARQ-ACK feedback and CSI report in two frequency hops.

Disclosed herein are various embodiments of determining resources for UCI on PUSCH with frequency hopping. In some embodiments, a number of modulated symbols allocated for HARQ-ACK, CSI part 1, and CSI part 2 in each frequency hop may be determined according to a number of OFDM symbols for PUSCH in each frequency hop.

For example, the numbers of ODFM symbols for PUSCH in a first frequency hop and the second frequency hop may be denoted as $N_{sym,1}^{PUSCH}$ and $N_{sym,2}^{PUSCH}$, respectively. A number of modulated symbols for HARQ-ACK in the first frequency hop may then be determined to be either:

$$\left\lfloor \frac{N_{sym,1}^{PUSCH} \cdot N_1}{N_{sym,1}^{PUSCH} + N_{sym,2}^{PUSCH}} \right\rfloor \text{ or } \left\lceil \frac{N_{sym,1}^{PUSCH} \cdot N_1}{N_{sym,1}^{PUSCH} + N_{sym,2}^{PUSCH}} \right\rceil$$

Meanwhile, a number of modulated symbols for HARQ-ACK in the second frequency hop may be determined to be either:

$$N_1 - \left\lfloor \frac{N_{sym,1}^{PUSCH} \cdot N_1}{N_{sym,1}^{PUSCH} + N_{sym,2}^{PUSCH}} \right\rfloor \text{ or } N_1 - \left\lceil \frac{N_{sym,1}^{PUSCH} \cdot N_1}{N_{sym,1}^{PUSCH} + N_{sym,2}^{PUSCH}} \right\rceil$$

A similar relationship may be used to determine a number of modulated symbols for a CSI part 1 in each frequency hop, by replacing $N_1$ with $N_2$, where $N_2$ is a total number of modulated symbols for the CSI part 1. A similar relationship may also be used to determine a number of modulated symbols for a CSI part 2 in each frequency hop, by replacing $N_1$ with $N_3$, where $N_3$ is a total number of modulated symbols for the CSI part 2.

Note that various embodiments may be straightforwardly extended to cases for PUSCH transmission with more than one layer. For example, in some embodiments, a number of modulated symbols may be replaced by a number of REs or modulated symbols for all layers.

In various embodiments, the numbers of modulated symbols for various UCI types (e.g., HARQ-ACK, CSI part 1, and CSI part 2) across two frequency hops may depend upon which UCI types are present for transmission on PUSCH, and/or whether the various UCI types are present for transmission on the PUSCH with Uplink Shared Channel (UL-SCH).

A first option may establish HARQ-ACK part A, HARQ-ACK part B, CSI part 1A, CSI part 1B, CSI part 2A, and CSI part 2B across two frequency hops. In the first option, if HARQ-ACK is present for transmission on the PUSCH, HARQ-ACK part A and HARQ-ACK part B may be determined in accordance with the equations:

$$G^{ACK}(1) = N_L \cdot Q_m \cdot \lfloor G^{ACK} N_{symb,hop}^{PUSCH}(1) / (N_{symb,all}^{PUSCH} \cdot N_L \cdot Q_m) \rfloor$$

$$G^{ACK}(1) = N_L \cdot Q_m \cdot \lceil G^{ACK}/(N_L \cdot Q_m) \rceil - G^{ACK}(1)$$

In the first option, if CSI is present for transmission on the PUSCH with UL-SCH, then CSI part 1A, CSI part 1B, CSI part 2A, and CSI part 2B may be determined in accordance with the equations:

$$G^{CSI-part1}(1) = N_L \cdot Q_m \cdot \lfloor G^{CSI-part1} N_{symb,hop}^{PUSCH}(1) / (N_{symb,all}^{PUSCH} \cdot N_L \cdot Q_m) \rfloor$$

$$G^{CSI-part1}(2) = N_L \cdot Q_m \cdot \lceil G^{CSI-part1}/(N_L \cdot Q_m) \rceil - G^{CSI-part1}(1)$$

$$G^{CSI-part2}(1) = N_L \cdot Q_m \cdot \lfloor G^{CSI-part2} N_{symb,hop}^{PUSCH}(1) / (N_{symb,all}^{PUSCH} \cdot N_L \cdot Q_m) \rfloor$$

$$G^{CSI-part2}(2) = N_L \cdot Q_m \cdot \lceil G^{CSI-part2}/(N_L \cdot Q_m) \rceil - G^{CSI-part2}(1)$$

In the first option, if HARQ-ACK and CSI part 1 are present for transmission on the PUSCH without UL-SCH, then HARQ-ACK part A, HARQ-ACK part B, CSI part 1A, and CSI part 1B may be determined in accordance with the equations:

$$G^{ACK}(1) = N_L \cdot Q_m \cdot \lfloor G^{ACK} N_{symb,hop}^{PUSCH}(1) / (N_{symb,all}^{PUSCH} \cdot N_L \cdot Q_m) \rfloor$$

$$G^{ACK}(2) = N_L \cdot Q_m \cdot \lceil G^{ACK}/(N_L \cdot Q_m) \rceil - G^{ACK}(1)$$

$$G^{CSI-part1}(1) = N_L \cdot Q_m \cdot \sum_{l=0}^{N_{symb,hop}^{PUSCH}(1)-1} \overline{M}_{sc}^{UCI}(l) - G^{ACK}(1)$$

$$G^{CSI-part1}(2) = N_L \cdot Q_m \cdot \sum_{l=N_{symb,hop}^{PUSCH}(1)}^{N_{symb,hop}^{PUSCH}(1)+N_{symb,hop}^{PUSCH}(2)-1} \overline{M}_{sc}^{UCI}(l) - G^{ACK}(2)$$

In the first option, if HARQ-ACK, CSI part 1, and CSI part 2 are present for transmission on the PUSCH without UL-SCH, then HARQ-ACK part A, HARQ-ACK part B, CSI part 1A, CSI part 1B, CSI part 2A, and CSI part 2B may be determined in accordance with the equations:

$$G^{ACK}(1) = N_L \cdot Q_m \cdot \lfloor G^{ACK} N_{symb,hop}^{PUSCH}(1) / (N_{symb,all}^{PUSCH} \cdot N_L \cdot Q_m) \rfloor$$

$$G^{ACK}(2) = N_L \cdot Q_m \cdot \lceil G^{ACK}/(N_L \cdot Q_m) \rceil - G^{ACK}(1)$$

$$G^{CSI-part1}(1) = N_L \cdot Q_m \cdot \lfloor G^{CSI-part1} N_{symb,hop}^{PUSCH}(1) / (N_{symb,all}^{PUSCH} \cdot N_L \cdot Q_m) \rfloor$$

$$G^{CSI-part1}(2) = N_L \cdot Q_m \cdot \lceil G^{CSI-part1}/(N_L \cdot Q_m) \rceil - G^{CSI-part1}(1)$$

$$G^{CSI-part2}(1) = N_L \cdot Q_m \cdot \sum_{l=0}^{N_{symb,hop}^{PUSCH}(1)-1} \overline{M}_{sc}^{UCI}(l) - G^{ACK}(1) - G^{CSI-part1}(1)$$

$$G^{CSI-part2}(2) = N_L \cdot Q_m \cdot \sum_{l=N_{symb,hop}^{PUSCH}(1)}^{N_{symb,hop}^{PUSCH}(1)+N_{symb,hop}^{PUSCH}(2)-1} \overline{M}_{sc}^{UCI}(l) - G^{ACK}(2) - G^{CSI-part1}(2)$$

In the first option, if CSI part 1 and CSI part 2 are present for transmission on the PUSCH without UL-SCH, then CSI part 1A, CSI part 1B, CSI part 2A, and CSI part 2B may be determined in accordance with the equations:

$$G^{CSI-part1}(1) = N_L \cdot Q_m \cdot \lfloor G^{CSI-part1} N_{symb,hop}^{PUSCH}(1) / (N_{symb,all}^{PUSCH} \cdot N_L \cdot Q_m) \rfloor$$

$$G^{CSI-part1}(2) = N_L \cdot Q_m \cdot \lceil G^{CSI-part1}/(N_L \cdot Q_m) \rceil - G^{CSI-part1}(1)$$

$$G^{CSI-part2}(1) = N_L \cdot Q_m \cdot \sum_{l=0}^{N_{symb,hop}^{PUSCH}(1)-1} \overline{M}_{sc}^{UCI}(l) - G^{CSI-part1}(1)$$

$$G^{CSI-part2}(2) = N_L \cdot Q_m \cdot \sum_{l=N_{symb,hop}^{PUSCH}(1)}^{N_{symb,hop}^{PUSCH}(1)+N_{symb,hop}^{PUSCH}(2)-1} \overline{M}_{sc}^{UCI}(l) - G^{CSI-part1}(2)$$

A second option may also establish HARQ-ACK part A, HARQ-ACK part B, CSI part 1A, CSI part 1B, CSI part 2A, and CSI part 2B across two frequency hops. In the second option, if HARQ-ACK is present for transmission on the PUSCH, then HARQ-ACK part A and HARQ-ACK part B may be determined in accordance with the equations:

$$G^{ACK}(1) = N_L \cdot Q_m \cdot \lfloor G^{ACK} N_{symb,hop}^{PUSCH}(1) / (N_{symb,all}^{PUSCH} \cdot N_L \cdot Q_m) \rfloor$$

$$G^{ACK}(2) = N_L \cdot Q_m \cdot \lceil G^{ACK}/(N_L \cdot Q_m) \rceil - G^{ACK}(1)$$

In the second option, if CSI is present for transmission on the PUSCH with UL-SCH, then CSI part 1A, CSI part 1B, CSI part 2A, and CSI part 2B may be determined in accordance with the equations:

$$G^{CSI-part1}(1) = N_L \cdot Q_m \cdot \lfloor G^{CSI-part1} N_{symb,hop}^{PUSCH}(1) / (N_{symb,all}^{PUSCH} \cdot N_L \cdot Q_m) \rfloor$$

$$G^{CSI-part1}(2) = N_L \cdot Q_m \cdot \lceil G^{CSI-part1}/(N_L \cdot Q_m) \rceil - G^{CSI-part1}(1)$$

$$G^{CSI-part2}(1) = N_L \cdot Q_m \cdot \lfloor G^{CSI-part2} N_{symb,hop}^{PUSCH}(1) / (N_{symb,all}^{PUSCH} \cdot N_L \cdot Q_m) \rfloor$$

$$G^{CSI-part2}(2) = N_L \cdot Q_m \cdot \lceil G^{CSI-part2}/(N_L \cdot Q_m) \rceil - G^{CSI-part2}(1)$$

In the second option, if HARQ-ACK and CSI part 1 are present for transmission on the PUSCH without UL-SCH, then HARQ-ACK part A, HARQ-ACK part B, CSI part 1A, and CSI part 1B may be determined in accordance with the equations:

$$G^{ACK}(1) = N_L \cdot Q_m \cdot \lfloor G^{ACK} N_{symb,hop}^{PUSCH}(1) / (N_{symb,all}^{PUSCH} \cdot N_L \cdot Q_m) \rfloor$$

$$G^{ACK}(2) = N_L \cdot Q_m \cdot \lceil G^{ACK}/(N_L \cdot Q_m) \rceil - G^{ACK}(1)$$

$$G^{CSI\text{-}part1}(1)=N_L \cdot Q_m \cdot \lfloor G^{CSI\text{-}part1} N_{symb,hop}^{PUSCH}(1)/(N_{symb,all}^{PUSCH} \cdot N_L \cdot Q_m) \rfloor$$

$$G^{CSI\text{-}part1}(2)=N_L \cdot Q_m \cdot \lceil G^{CSI\text{-}part1}/(N_L \cdot Q_m) \rceil - G^{CSI\text{-}part1}(1)$$

In the second option, if HARQ-ACK, CSI part 1, and CSI part 2 are present for transmission on the PUSCH without UL-SCH, then HARQ-ACK part A, HARQ-ACK part B, CSI part 1A, CSI part 1B, CSI part 2A, and CSI part 2B may be determined in accordance with the equations:

$$G^{ACK}(1)=N_L \cdot Q_m \cdot \lfloor G^{ACK} N_{symb,hop}^{PUSCH}(1)/(N_{symb,all}^{PUSCH} \cdot N_L \cdot Q_m) \rfloor$$

$$G^{ACK}(2)=N_L \cdot Q_m \cdot \lceil G^{ACK}/(N_L \cdot Q_m) \rceil - G^{ACK}(1)$$

$$G^{CSI\text{-}part1}(1)=N_L \cdot Q_m \cdot \lfloor G^{CSI\text{-}part1} N_{symb,hop}^{PUSCH}(1)/(N_{symb,all}^{PUSCH} \cdot N_L \cdot Q_m) \rfloor$$

$$G^{CSI\text{-}part1}(2)=N_L \cdot Q_m \cdot \lceil G^{CSI\text{-}part1}/(N_L \cdot Q_m) \rceil - G^{CSI\text{-}part1}(1)$$

$$G^{CSI\text{-}part2}(1)=N_L \cdot Q_m \cdot \lfloor G^{CSI\text{-}part2} N_{symb,hop}^{PUSCH}(1)/(N_{symb,all}^{PUSCH} \cdot N_L \cdot Q_m) \rfloor$$

$$G^{CSI\text{-}part2}(2)=N_L \cdot Q_m \cdot \lceil G^{CSI\text{-}part2}/(N_L \cdot Q_m) \rceil - G^{CSI\text{-}part2}(1)$$

In the second option, if CSI part 1 and CSI part 2 are present for transmission on the PUSCH without UL-SCH, then CSI part 1A, CSI part 1B, CSI part 2A, and CSI part 2B may be determined in accordance with the equations:

$$G^{CSI\text{-}part1}(1)=N_L \cdot Q_m \cdot \lfloor G^{CSI\text{-}part1} N_{symb,hop}^{PUSCH}(1)/(N_{symb,all}^{PUSCH} \cdot N_L \cdot Q_m) \rfloor$$

$$G^{CSI\text{-}part1}(2)=N_L \cdot Q_m \cdot \lceil G^{CSI\text{-}part1}/(N_L \cdot Q_m) \rceil - G^{CSI\text{-}part1}(1)$$

$$G^{CSI\text{-}part2}(1)=N_L \cdot Q_m \cdot \lfloor G^{CSI\text{-}part2} N_{symb,hop}^{PUSCH}(1)/(N_{symb,all}^{PUSCH} \cdot N_L \cdot Q_m) \rfloor$$

$$G^{CSI\text{-}part2}(2)=N_L \cdot Q_m \cdot \lceil G^{CSI\text{-}part2}/(N_L \cdot Q_m) \rceil - G^{CSI\text{-}part2}(1)$$

In some embodiments, in cases of UCI on PUSCH without UL-SCH, when UCI fills a total number of REs on PUSCH, some UCI types may be roughly equally split into two partitions, and each partition may be mapped in one frequency hop. Remaining REs in each frequency hop may be allocated for other UCI types.

In one example, in cases when HARQ-ACK and CSI part 1 are piggybacked on PUSCH without UL-SCH, modulated symbols for HARQ-ACK feedback may be roughly equally divided into two partitions, with a floor of a number (N1/2) in the first frequency hop and a ceiling of a number (N1/2) in the second frequency hop. Furthermore, denote a total number of available REs (e.g., excluding Demodulation Reference Signal (DM-RS) symbols or REs and/or Phase Tracking Reference Signal (PT-RS) symbols or REs) in the first frequency hop and second frequency hop as $N_{RE}^{hop,1}$ and $N_{RE}^{hop,2}$, respectively. The number of REs for CSI part 1 in the first frequency hop and the second frequency hop may then be determined, respectively, in accordance with the equations:

$$N_{RE}^{hop,1} - \lfloor N_1/2 \rfloor$$

$$N_{RE}^{hop,2} - \lceil N_1/2 \rceil$$

In another example, in cases when HARQ-ACK, CSI part 1, and CSI part 2 are piggybacked on PUSCH without UL-SCH, modulated symbols for HARQ-ACK feedback and CSI part 1 may be roughly equally divided into two partitions, with a floor of a number (N1/2) and a floor of a number (N2/2) in the first frequency hop, and with a ceiling of a number (N1/2) and a ceiling of a number (N2/2) in the second frequency hop. Furthermore, the number of REs for CSI part 2 in the first frequency hop and the second frequency hop may be determined, respectively, in accordance with the equations:

$$N_{RE}^{hop,1} - \lfloor N_1/2 \rfloor - \lfloor N_2/2 \rfloor$$

$$N_{RE}^{hop,2} - \lceil N_1/2 \rceil - \lceil N_2/2 \rceil$$

A similar approach may be applied for cases in which CSI part 1 and CSI part 2 are piggybacked on PUSCH without UL-SCH. In such cases, modulated symbols for CSI part 1 may be roughly equally divided into two partitions, with a floor of a number (N2/2) in the first frequency hop and a ceiling of a number (N2/2) in the second frequency hop. Furthermore, the number of REs for CSI part 2 in the first frequency hop and the second frequency hop may be determined, respectively, in accordance with the equations:

$$N_{RE}^{hop,1} - \lfloor N_2/2 \rfloor$$

$$N_{RE}^{hop,2} - \lceil N_2/2 \rceil$$

In various embodiments, a similar approach may be straightforwardly extended to cases for PUSCH transmission with more than one layer. Note that the number of REs in the above embodiments may be replaced by the number of available REs for all layers.

In some embodiments, if HARQ-ACK and CSI part 1 are present for transmission on the PUSCH without UL-SCH, HARQ-ACK may be roughly equally divided into two parts, while the remaining REs for all layers may be allocated for CSI part 1.

In some embodiments, if HARQ-ACK, CSI part 1, and CSI part 2 are present for transmission on the PUSCH without UL-SCH, HARQ-ACK and CSI part 1 may be roughly equally divided into two parts, while the remaining REs for all layers may be allocated for CSI part 2.

In some embodiments, if CSI part 1 and CSI part 2 are present for transmission on the PUSCH without UL-SCH, CSI part 1 may be roughly equally divided into two parts, while the remaining REs for all layers may be allocated for CSI part 2.

Accordingly, various embodiments may establish HARQ-ACK part A, HARQ-ACK part B, CSI part 1A, CSI part 1B, CSI part 2A, and CSI part 2B across two frequency hops. In some embodiments, if HARQ-ACK is present for transmission on the PUSCH, then HARQ-ACK part A and HARQ-ACK part B may be determined in accordance with the equations:

$$G^{ACK}(1)=N_L \cdot Q_m \cdot \lfloor G^{ACK}/(2 \cdot N_L \cdot Q_m) \rfloor$$

$$G^{ACK}(2)=N_L \cdot Q_m \cdot \lceil G^{ACK}/(2 \cdot N_L \cdot Q_m) \rceil$$

In some embodiments, if CSI is present for transmission on the PUSCH with UL-SCH, then CSI part 1A, CSI part 1B, CSI part 2A, and CSI part 2B may be determined in accordance with the equations:

$$G^{CSI\text{-}part1}(1)=N_L \cdot Q_m \cdot \lfloor G^{CSI\text{-}part1}/(2 \cdot N_L \cdot Q_m) \rfloor$$

$$G^{CSI\text{-}part1}(2)=N_L \cdot Q_m \cdot \lceil G^{CSI\text{-}part1}/(2 \cdot N_L \cdot Q_m) \rceil$$

$$G^{CSI\text{-}part2}(1)=N_L \cdot Q_m \cdot \lfloor G^{CSI\text{-}part2}/(2 \cdot N_L \cdot Q_m) \rfloor$$

$$G^{CSI\text{-}part2}(2)=N_L \cdot Q_m \cdot \lceil G^{CSI\text{-}part2}/(2 \cdot N_L \cdot Q_m) \rceil$$

In some embodiments, if HARQ-ACK and CSI part 1 are present for transmission on the PUSCH without UL-SCH, then HARQ-ACK part A, HARQ-ACK part B, CSI part 1A, and CSI part 1B may be determined in accordance with the equations:

$$G^{ACK}(1) = N_L \cdot Q_m \cdot \lfloor G^{ACK}/(2 \cdot N_L \cdot Q_m) \rfloor$$

$$G^{ACK}(2) = N_L \cdot Q_m \cdot \lceil G^{ACK}/(2 \cdot N_L \cdot Q_m) \rceil$$

$$G^{CSI\text{-}part1}(1) = N_L \cdot Q_m \cdot \sum_{l=0}^{N_{symb,hop}^{PUSCH}(1)-1} \overline{M}_{sc}^{UCI}(l) - G^{ACK}(1)$$

$$G^{CSI\text{-}part1}(2) = N_L \cdot Q_m \cdot \sum_{l=N_{symb,hop}^{PUSCH}(1)}^{N_{symb,hop}^{PUSCH}(1)+N_{symb,hop}^{PUSCH}(2)-1} \overline{M}_{sc}^{UCI}(l) - G^{ACK}(2)$$

In some embodiments, if HARQ-ACK, CSI part 1, and CSI part 2 are present for transmission on the PUSCH without UL-SCH, then HARQ-ACK part A, HARQ-ACK part B, CSI part 1A, CSI part 1B, CSI part 2A, and CSI part 2B may be determined in accordance with the equations:

$$G^{ACK}(1) = N_L \cdot Q_m \cdot \lfloor G^{ACK}/(2 \cdot N_L \cdot Q_m) \rfloor$$

$$G^{ACK}(2) = N_L \cdot Q_m \cdot \lceil G^{ACK}/(2 \cdot N_L \cdot Q_m) \rceil$$

$$G^{CSI\text{-}part1}(1) = N_L \cdot Q_m \cdot \lfloor G^{CSI\text{-}part1}/(2 \cdot N_L \cdot Q_m) \rfloor$$

$$G^{CSI\text{-}part1}(2) = N_L \cdot Q_m \cdot \lceil G^{CSI\text{-}part1}/(2 \cdot N_L \cdot Q_m) \rceil$$

$$G^{CSI\text{-}part2}(1) = N_L \cdot Q_m \cdot \sum_{l=0}^{N_{symb,hop}^{PUSCH}(1)-1} \overline{M}_{sc}^{UCI}(l) - G^{ACK}(1) - G^{CSI\text{-}part1}(1)$$

$$G^{CSI\text{-}part2}(2) = N_L \cdot Q_m \cdot \sum_{l=N_{symb,hop}^{PUSCH}(1)}^{N_{symb,hop}^{PUSCH}(1)+N_{symb,hop}^{PUSCH}(2)-1} \overline{M}_{sc}^{UCI}(l) - G^{ACK}(2) - G^{CSI\text{-}part1}(2)$$

In some embodiments, if CSI part 1 and CSI part 2 are present for transmission on the PUSCH without UL-SCH, then CSI part 1A, CSI part 1B, CSI part 2A, and CSI part 2B may be determined in accordance with the equations:

$$G^{CSI\text{-}part1}(1) = N_L \cdot Q_m \cdot \lfloor G^{CSI\text{-}part1}/(2 \cdot N_L \cdot Q_m) \rfloor$$

$$G^{CSI\text{-}part1}(2) = N_L \cdot Q_m \cdot \lceil G^{CSI\text{-}part1}/(2 \cdot N_L \cdot Q_m) \rceil$$

$$G^{CSI\text{-}part2}(1) = N_L \cdot Q_m \cdot \sum_{l=0}^{N_{symb,hop}^{PUSCH}(1)-1} \overline{M}_{sc}^{UCI}(l) - G^{CSI\text{-}part1}(1)$$

$$G^{CSI\text{-}part2}(2) = N_L \cdot Q_m \cdot \sum_{l=N_{symb,hop}^{PUSCH}(1)}^{N_{symb,hop}^{PUSCH}(1)+N_{symb,hop}^{PUSCH}(2)-1} \overline{M}_{sc}^{UCI}(l) - G^{CSI\text{-}part1}(2)$$

A variety of embodiments may pertain to mechanisms and methods of determining resources for UCI on PUCCH with frequency hopping. For simultaneous transmission of HARQ-ACK, SR, and/or CSI report with PUCCH Format 3 or Format 4, the HARQ-ACK, SR, and/or CSI part 1 bits may be jointly encoded. CSI part 2 bits may be separately encoded.

Furthermore, encoded and modulated symbols (e.g., N1 symbols) for HARQ-ACK, SR, and/or CSI part 1 may be mapped around DM-RS symbols. Encoded and modulated symbols (e.g., N2 symbols) for CSI part 2 may be mapped in remaining REs.

In addition, in cases of frequency hopping for a long PUCCH, a number of symbols in a first frequency hop may be a floor number (N/2) and a number of symbols in the second frequency hop may be a ceiling number (N/2), where N may be a length of the long PUCCH.

In various embodiments, resources for UCI on PUCCH in frequency hopping scenarios may be determined in a variety of ways. In some embodiments, a number of modulated symbols allocated for HARQ-ACK, SR, CSI part 1, and/or CSI part 2 in each frequency hop may be determined according to a number of OFDM symbols for PUCCH in each frequency hop. For example, the numbers of ODFM symbols for PUCCH in the first frequency hop and the second frequency hop may be denoted as $N_{sym,1}^{PUCCH}$ and $N_{sym,2}^{PUCCH}$, respectively. The number of modulated symbols for HARQ-ACK, SR, and/or CSI part 1 in the first frequency hop may then be determined to be either:

$$\left\lfloor \frac{N_{sym,1}^{PUSCH} \cdot N_1}{N_{sym,1}^{PUSCH} + N_{sym,2}^{PUSCH}} \right\rfloor \text{ or } \left\lceil \frac{N_{sym,1}^{PUSCH} \cdot N_1}{N_{sym,1}^{PUSCH} + N_{sym,2}^{PUSCH}} \right\rceil$$

The number of modulated symbols for HARQ-ACK, SR, and/or CSI part 1 in the second frequency hop may be determined to be either:

$$N_1 - \left\lfloor \frac{N_{sym,1}^{PUSCH} \cdot N_1}{N_{sym,1}^{PUSCH} + N_{sym,2}^{PUSCH}} \right\rfloor \text{ or } N_1 - \left\lceil \frac{N_{sym,1}^{PUSCH} \cdot N_1}{N_{sym,1}^{PUSCH} + N_{sym,2}^{PUSCH}} \right\rceil$$

Furthermore, remaining REs in each hop may be allocated for CSI part 2.

For some embodiments, a number of modulated symbols for HARQ-ACK, SR, and/or CSI part 1 may be roughly equally divided into two partitions, with a floor of a number (N1/2) in the first frequency hop and a ceiling of a number (N1/2) in the second frequency hop. For example, the total number of available REs (e.g., excluding DM-RS symbols or REs) in the first frequency hop and the second frequency hop may be denoted as $N_{RE}^{hop,1}$ and $N_{RE}^{hop,2}$, respectively. The number of REs for CSI part 2 in the first frequency hop may then be determined to be:

$$N_{RE}^{hop,1} - \lfloor N_1/2 \rfloor$$

The number of REs for CSI part 2 in the second frequency hop may be determined to be:

$$N_{RE}^{hop,2} - \lceil N_1/2 \rceil$$

Figure 2:
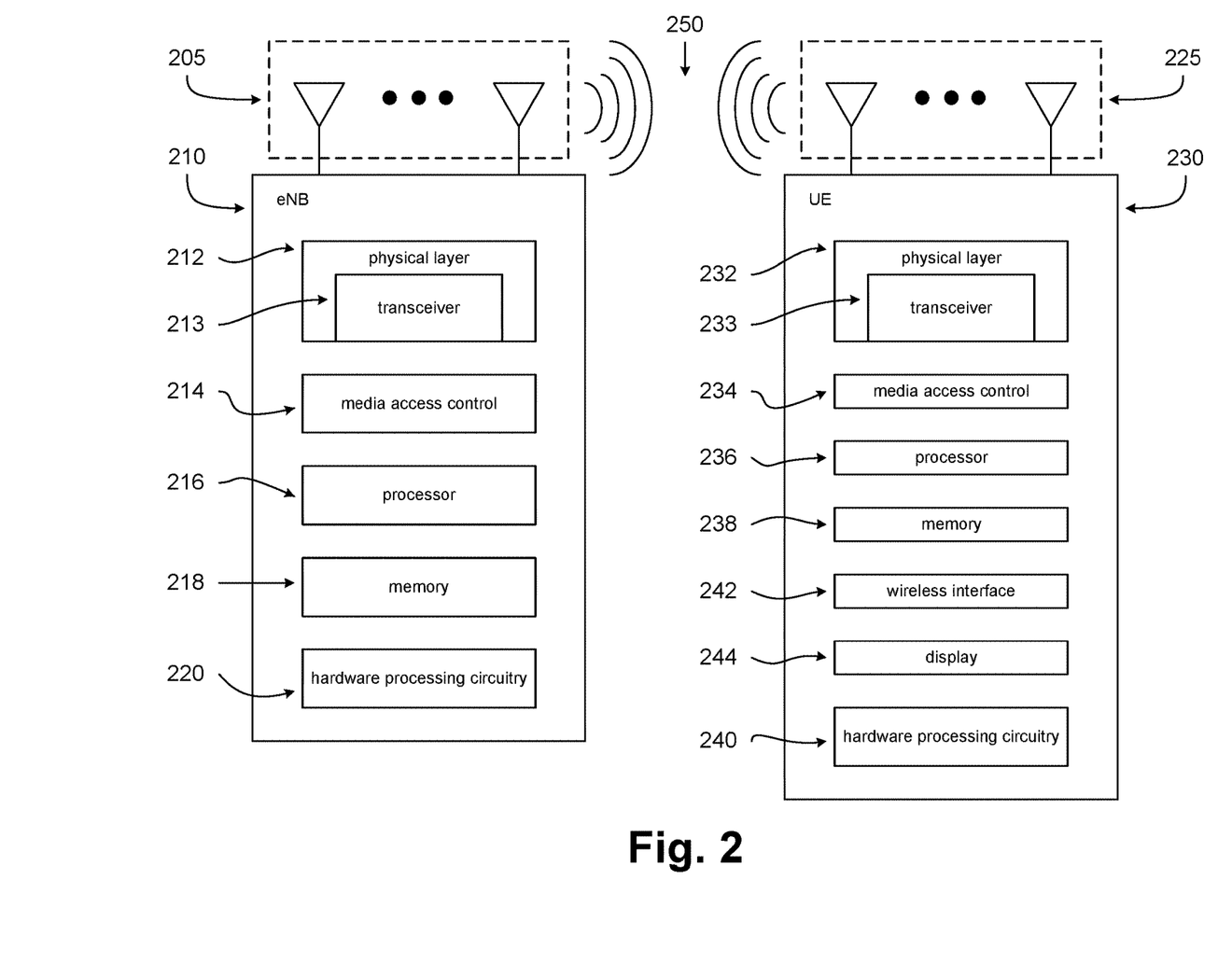
FIG. 2 illustrates an Evolved Node-B (eNB) and a User Equipment (UE), in accordance with some embodiments of the disclosure.

FIG. 2 illustrates an eNB and a UE, in accordance with some embodiments of the disclosure. FIG. 2 includes block diagrams of an eNB 210 and a UE 230 which are operable to co-exist with each other and other elements of an LTE network. High-level, simplified architectures of eNB 210 and UE 230 are described so as not to obscure the embodiments. It should be noted that in some embodiments, eNB 210 may be a stationary non-mobile device.

eNB 210 is coupled to one or more antennas 205, and UE 230 is similarly coupled to one or more antennas 225. However, in some embodiments, eNB 210 may incorporate or comprise antennas 205, and UE 230 in various embodiments may incorporate or comprise antennas 225.

In some embodiments, antennas 205 and/or antennas 225 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 205 are separated to take advantage of spatial diversity.

eNB 210 and UE 230 are operable to communicate with each other on a network, such as a wireless network. eNB 210 and UE 230 may be in communication with each other over a wireless communication channel 250, which has both a downlink path from eNB 210 to UE 230 and an uplink path from UE 230 to eNB 210.

As illustrated in FIG. 2, in some embodiments, eNB 210 may include a physical layer circuitry 212, a MAC (media access control) circuitry 214, a processor 216, a memory 218, and a hardware processing circuitry 220. A person skilled in the art will appreciate that other components not shown may be used in addition to the components shown to form a complete eNB.

In some embodiments, physical layer circuitry 212 includes a transceiver 213 for providing signals to and from UE 230. Transceiver 213 provides signals to and from UEs or other devices using one or more antennas 205. In some embodiments, MAC circuitry 214 controls access to the wireless medium. Memory 218 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 220 may comprise logic devices or circuitry to perform various operations. In some embodiments, processor 216 and memory 218 are arranged to perform the operations of hardware processing circuitry 220, such as operations described herein with reference to logic devices and circuitry within eNB 210 and/or hardware processing circuitry 220.

Accordingly, in some embodiments, eNB 210 may be a device comprising an application processor, a memory, one or more antenna ports, and an interface for allowing the application processor to communicate with another device.

As is also illustrated in FIG. 2, in some embodiments, UE 230 may include a physical layer circuitry 232, a MAC circuitry 234, a processor 236, a memory 238, a hardware processing circuitry 240, a wireless interface 242, and a display 244. A person skilled in the art would appreciate that other components not shown may be used in addition to the components shown to form a complete UE.

In some embodiments, physical layer circuitry 232 includes a transceiver 233 for providing signals to and from eNB 210 (as well as other eNBs). Transceiver 233 provides signals to and from eNBs or other devices using one or more antennas 225. In some embodiments, MAC circuitry 234 controls access to the wireless medium. Memory 238 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 242 may be arranged to allow the processor to communicate with another device.

Display 244 may provide a visual and/or tactile display for a user to interact with UE 230, such as a touch-screen display. Hardware processing circuitry 240 may comprise logic devices or circuitry to perform various operations. In some embodiments, processor 236 and memory 238 may be arranged to perform the operations of hardware processing circuitry 240, such as operations described herein with reference to logic devices and circuitry within UE 230 and/or hardware processing circuitry 240.

Accordingly, in some embodiments, UE 230 may be a device comprising an application processor, a memory, one or more antennas, a wireless interface for allowing the application processor to communicate with another device, and a touch-screen display.

Elements of FIG. 2, and elements of other figures having the same names or reference numbers, can operate or function in the manner described herein with respect to any such figures (although the operation and function of such elements is not limited to such descriptions). For example, FIGS. 3-4 also depict embodiments of eNBs, hardware processing circuitry of eNBs, UEs, and/or hardware processing circuitry of UEs, and the embodiments described with respect to FIG. 2 and FIGS. 3-4 can operate or function in the manner described herein with respect to any of the figures.

In addition, although eNB 210 and UE 230 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

With reference to FIG. 2, a UE may include various hardware processing circuitries discussed herein, which may in turn comprise logic devices and/or circuitry operable to perform various operations. For example, in FIG. 2, UE 230 (or various elements or components therein, such as hardware processing circuitry 240, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 236 (and/or one or more other processors which UE 230 may comprise), memory 238, and/or other elements or components of UE 230 (which may include hardware processing circuitry 240) may be arranged to perform the operations of these hardware processing circuitries, such as operations described herein with reference to devices and circuitry within these hardware processing circuitries. In some embodiments, processor 236 (and/or one or more other processors which UE 230 may comprise) may be a baseband processor.

With respect to a variety of embodiments, an apparatus of UE 230 (or another UE or mobile handset), which may be operable to communicate with one or more eNBs on a wireless network, may comprise a hardware processing circuitry. In some embodiments, the hardware processing circuitry may comprise one or more antenna ports operable to provide various transmissions over a wireless communication channel (such as wireless communication channel 250). The antenna ports may be coupled to one or more antennas (which may be antennas 225). In some embodiments, the hardware processing circuitry may incorporate the antennas, while in other embodiments, the hardware processing circuitry may merely be coupled to the antennas.

The antenna ports and the antennas may be operable to provide signals from a UE to a wireless communications channel and/or an eNB, and may be operable to provide signals from an eNB and/or a wireless communications channel to a UE. For example, the antenna ports and the antennas may be operable to provide transmissions from UE 230 to wireless communication channel 250 (and from there to eNB 210, or to another eNB). Similarly, the antennas and the antenna ports may be operable to provide transmissions from a wireless communication channel 250 (and beyond that, from eNB 210, or another eNB) to UE 230.

The hardware processing circuitry may comprise various circuitries operable in accordance with the various embodiments discussed herein. The hardware processing circuitry may comprise a first circuitry and/or a second circuitry. The first circuitry may be operable to allocate a first set of REs for a set of UCI types corresponding with a first set of frequency resources. The first circuitry may also be operable to allocate a second set of REs for the set of UCI types corresponding with a second set of frequency resources. The second circuitry may be operable to prepare one or more PUSCH transmissions comprising the first set of REs and the second set of REs. A number of REs in the first set of REs may be different than a number of REs in the second set of REs. The hardware processing circuitry may also comprise an interface for sending the PUSCH transmissions to a transmission circuitry.

In some embodiments, the set of UCI types may comprise a HARQ-ACK, a CSI part 1, and/or a CSI part 2. For some embodiments, a number of REs corresponding with a CSI part 1 in the first set of REs may be different than a number of REs corresponding with the CSI part 1 in the second set of REs. In some embodiments, a number of REs corresponding with a CSI part 2 in the first set of REs may be different than a number of REs corresponding with the CSI part 2 in the second set of REs. For some embodiments, the one or more PUSCH transmissions may be within a single slot comprising 14 OFDM symbols.

For some embodiments, the first set of frequency resources may correspond to a first frequency hop, and the second set of frequency resources may correspond to a second frequency hop. In some embodiments, the first set of REs may comprise a first number of REs corresponding with a HARQ-ACK, and the second set of REs may comprise a second number of REs corresponding with the HARQ-ACK, the second number of REs corresponding with the HARQ-ACK being the same as the first number of REs corresponding with the HARQ-ACK. For some embodiments, the first set of REs may comprise a first number of REs corresponding with a CSI part 1, and the second set of REs may comprise a second number of REs corresponding with the CSI part 1, the second number of REs corresponding with the CSI part 1 being different than the first number of REs corresponding with the CSI part 1.

In some embodiments, the first set of REs may comprise a first number of REs corresponding with a CSI part 1; the second set of REs may comprise a second number of REs corresponding with the CSI part 1, the second number of REs corresponding with the CSI part 1 being the same as the first number of REs corresponding with the CSI part 1; the first set of REs may comprise a first number of REs corresponding with a CSI part 2; and/or the second set of REs may comprise a second number of REs corresponding with the CSI part 2, the second number of REs corresponding with the CSI part 2 being different than the first number of REs corresponding with the CSI part 2.

In some embodiments, the first circuitry and/or the second circuitry may be implemented as separate circuitries. In other embodiments, the first circuitry and/or the second circuitry may be combined and implemented together in a circuitry without altering the essence of the embodiments.

With reference to FIG. 2, methods that may relate to UE 230 and hardware processing circuitry 240 are discussed herein. Although the actions described herein may be described in a particular order, the order of the actions can be modified. Thus, in various embodiments, the actions can be performed in a different order, and some actions may be performed in parallel. Some of the actions and/or operations are optional in accordance with certain embodiments. Additionally, operations from the various flows may be utilized in a variety of combinations.

Moreover, in some embodiments, machine readable storage media may have executable instructions that, when executed, cause UE 230 and/or hardware processing circuitry 240 to perform an operation comprising the methods discussed herein. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods discussed herein.

With respect to a variety of embodiments, various methods may be in accordance with the various embodiments discussed herein. A method may comprise a first allocating, a second allocating, and a preparing. In the first allocating, a first set of REs may be allocated for a set of UCI types corresponding with a first set of frequency resources. In the second allocating, a second set of REs may be allocated for the set of UCI types corresponding with a second set of frequency resources. In the preparing, one or more PUSCH transmissions comprising the first set of REs and the second set of REs may be prepared.

In some embodiments, the set of UCI types may comprise a HARQ-ACK, a CSI part 1, and/or a CSI part 2. For some embodiments, a number of REs corresponding with a CSI part 1 in the first set of REs may be different than a number of REs corresponding with the CSI part 1 in the second set of REs. In some embodiments, a number of REs corresponding with a CSI part 2 in the first set of REs may be different than a number of REs corresponding with the CSI part 2 in the second set of REs. For some embodiments, the one or more PUSCH transmissions may be within a single slot comprising 14 OFDM symbols.

For some embodiments, the first set of frequency resources may correspond to a first frequency hop, and the second set of frequency resources may correspond to a second frequency hop. In some embodiments, the first set of REs may comprise a first number of REs corresponding with a HARQ-ACK, and the second set of REs may comprise a second number of REs corresponding with the HARQ-ACK, the second number of REs corresponding with the HARQ-ACK being the same as the first number of REs corresponding with the HARQ-ACK. For some embodiments, the first set of REs may comprise a first number of REs corresponding with a CSI part 1, and the second set of REs may comprise a second number of REs corresponding with the CSI part 1, the second number of REs corresponding with the CSI part 1 being different than the first number of REs corresponding with the CSI part 1.

In some embodiments, the first set of REs may comprise a first number of REs corresponding with a CSI part 1; the second set of REs may comprise a second number of REs corresponding with the CSI part 1, the second number of REs corresponding with the CSI part 1 being the same as the first number of REs corresponding with the CSI part 1; the first set of REs may comprise a first number of REs corresponding with a CSI part 2; and/or the second set of REs may comprise a second number of REs corresponding with the CSI part 2, the second number of REs corresponding with the CSI part 2 being different than the first number of REs corresponding with the CSI part 2.

Figure 3:
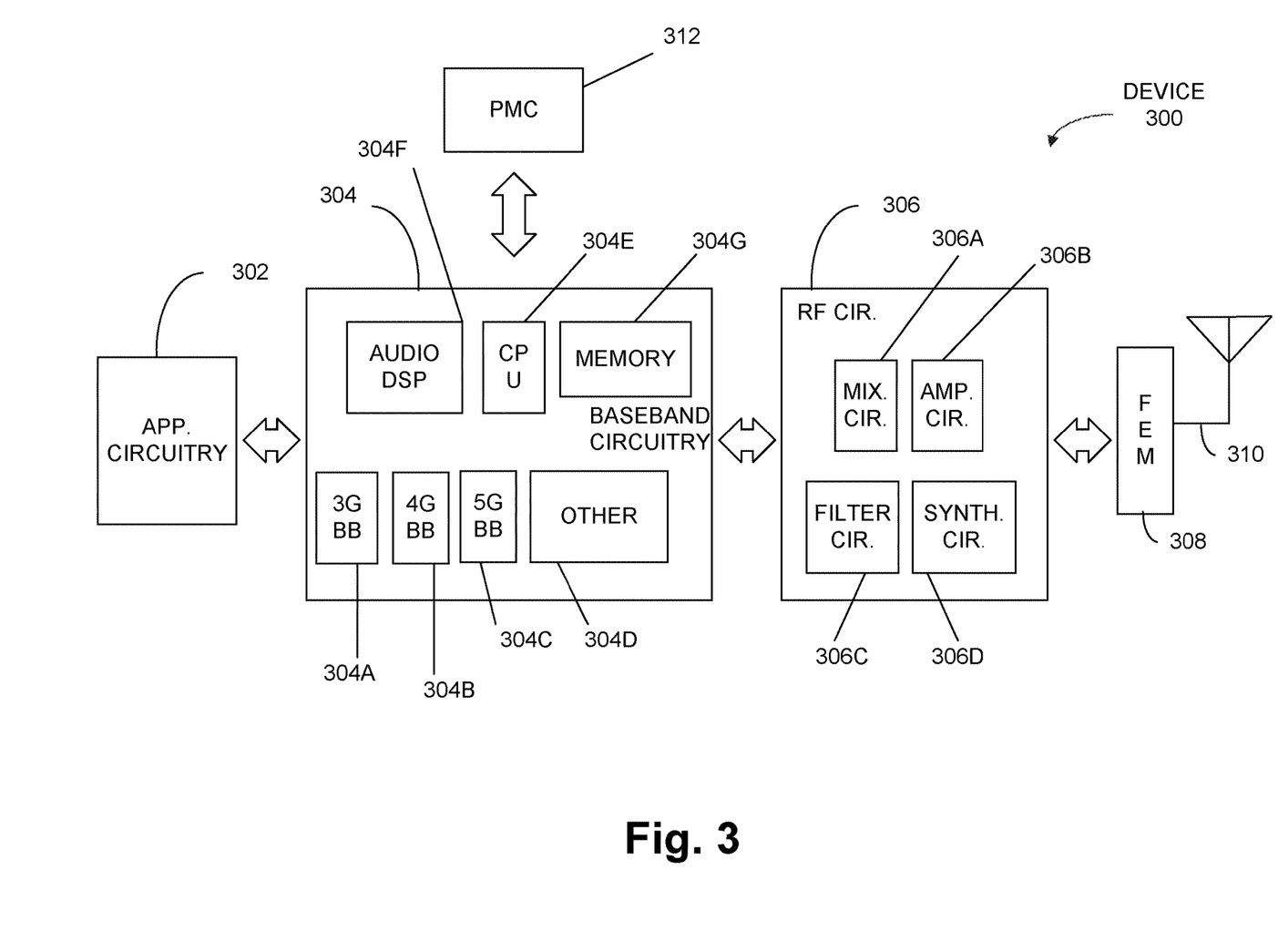
FIG. 3 illustrates example components of a device, in accordance with some embodiments of the disclosure.

FIG. 3 illustrates example components of a device, in accordance with some embodiments of the disclosure. In some embodiments, the device 300 may include application circuitry 302, baseband circuitry 304, Radio Frequency (RF) circuitry 306, front-end module (FEM) circuitry 308, one or more antennas 310, and power management circuitry (PMC) 312 coupled together at least as shown. The components of the illustrated device 300 may be included in a UE or a RAN node. In some embodiments, the device 300 may include less elements (e.g., a RAN node may not utilize application circuitry 302, and instead include a processor/controller to process IP data received from an EPC). In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 300. In some embodiments, processors of application circuitry 302 may process IP data packets received from an EPC.

The baseband circuitry 304 may include circuitry such as, but not limited to, one or more single-core or multi-core processors. The baseband circuitry 304 may include one or more baseband processors or control logic to process baseband signals received from a receive signal path of the RF circuitry 306 and to generate baseband signals for a transmit signal path of the RF circuitry 306. Baseband processing circuitry 304 may interface with the application circuitry 302 for generation and processing of the baseband signals and for controlling operations of the RF circuitry 306. For example, in some embodiments, the baseband circuitry 304 may include a third generation (3G) baseband processor 304A, a fourth generation (4G) baseband processor 304B, a fifth generation (5G) baseband processor 304C, or other baseband processor(s) 304D for other existing generations, generations in development or to be developed in the future (e.g., second generation (2G), sixth generation (6G), and so on). The baseband circuitry 304 (e.g., one or more of baseband processors 304A-D) may handle various radio control functions that enable communication with one or more radio networks via the RF circuitry 306. In other embodiments, some or all of the functionality of baseband processors 304A-D may be included in modules stored in the memory 304G and executed via a Central Processing Unit (CPU) 304E. The radio control functions may include, but are not limited to, signal modulation/demodulation, encoding/decoding, radio frequency shifting, and so on. In some embodiments, modulation/demodulation circuitry of the baseband circuitry 304 may include Fast-Fourier Transform (FFT), precoding, or constellation mapping/demapping functionality. In some embodiments, encoding/decoding circuitry of the baseband circuitry 304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include one or more audio digital signal processor(s) (DSP) 304F. The audio DSP(s) 304F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, and so on to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the receive signal path of the RF circuitry 306 may include mixer circuitry 306A, amplifier circuitry 306B and filter circuitry 306C. In some embodiments, the transmit signal path of the RF circuitry 306 may include filter circuitry 306C and mixer circuitry 306A. RF circuitry 306 may also include synthesizer circuitry 306D for synthesizing a frequency for use by the mixer circuitry 306A of the receive signal path and the transmit signal path. In some embodiments, the mixer circuitry 306A of the receive signal path may be configured to down-convert RF signals received from the FEM circuitry 308 based on the synthesized frequency provided by synthesizer circuitry 306D. The amplifier circuitry 306B may be configured to amplify the down-converted signals and the filter circuitry 306C may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306A of the receive signal path may comprise passive mixers, although the scope of the embodiments is not limited in this respect.

In some embodiments, the mixer circuitry 306A of the transmit signal path may be configured to up-convert input baseband signals based on the synthesized frequency provided by the synthesizer circuitry 306D to generate RF output signals for the FEM circuitry 308. The baseband signals may be provided by the baseband circuitry 304 and may be filtered by filter circuitry 306C.

In some embodiments, the mixer circuitry 306A of the receive signal path and the mixer circuitry 306A of the transmit signal path may include two or more mixers and may be arranged for quadrature downconversion and upconversion, respectively. In some embodiments, the mixer circuitry 306A of the receive signal path and the mixer circuitry 306A of the transmit signal path may include two or more mixers and may be arranged for image rejection (e.g., Hartley image rejection). In some embodiments, the mixer circuitry 306A of the receive signal path and the mixer circuitry 306A may be arranged for direct downconversion and direct upconversion, respectively. In some embodiments, the mixer circuitry 306A of the receive signal path and the mixer circuitry 306A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306D may be a fractional-N synthesizer or a fractional N/N+1 synthesizer, although the scope of the embodiments is not limited in this respect as other types of frequency synthesizers may be suitable. For example, synthesizer circuitry 306D may be a delta-sigma synthesizer, a frequency multiplier, or a synthesizer comprising a phase-locked loop with a frequency divider.

The synthesizer circuitry 306D may be configured to synthesize an output frequency for use by the mixer circuitry 306A of the RF circuitry 306 based on a frequency input and a divider control input. In some embodiments, the synthesizer circuitry 306D may be a fractional N/N+1 synthesizer.

In some embodiments, frequency input may be provided by a voltage controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

Synthesizer circuitry 306D of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310. In various embodiments, the amplification through the transmit or receive signal paths may be done solely in the RF circuitry 306, solely in the FEM 308, or in both the RF circuitry 306 and the FEM 308.

In some embodiments, the FEM circuitry 308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the PMC 312 may manage power provided to the baseband circuitry 304. In particular, the PMC 312 may control power-source selection, voltage scaling, battery charging, or DC-to-DC conversion. The PMC 312 may often be included when the device 300 is capable of being powered by a battery, for example, when the device is included in a UE. The PMC 312 may increase the power conversion efficiency while providing desirable implementation size and heat dissipation characteristics.

While FIG. 3 shows the PMC 312 coupled only with the baseband circuitry 304. However, in other embodiments, the PMC 312 may be additionally or alternatively coupled with, and perform similar power management operations for, other components such as, but not limited to, application circuitry 302, RF circuitry 306, or FEM 308.

In some embodiments, the PMC 312 may control, or otherwise be part of, various power saving mechanisms of the device 300. For example, if the device 300 is in an RRC_Connected state, where it is still connected to the RAN node as it expects to receive traffic shortly, then it may enter a state known as Discontinuous Reception Mode (DRX) after a period of inactivity. During this state, the device 300 may power down for brief intervals of time and thus save power.

If there is no data traffic activity for an extended period of time, then the device 300 may transition off to an RRC_Idle state, where it disconnects from the network and does not perform operations such as channel quality feedback, handover, and so on. The device 300 goes into a very low power state and it performs paging where again it periodically wakes up to listen to the network and then powers down again. The device 300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 302 and processors of the baseband circuitry 304 may be used to execute elements of one or more instances of a protocol stack. For example, processors of the baseband circuitry 304, alone or in combination, may be used execute Layer 3, Layer 2, or Layer 1 functionality, while processors of the application circuitry 304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 4:
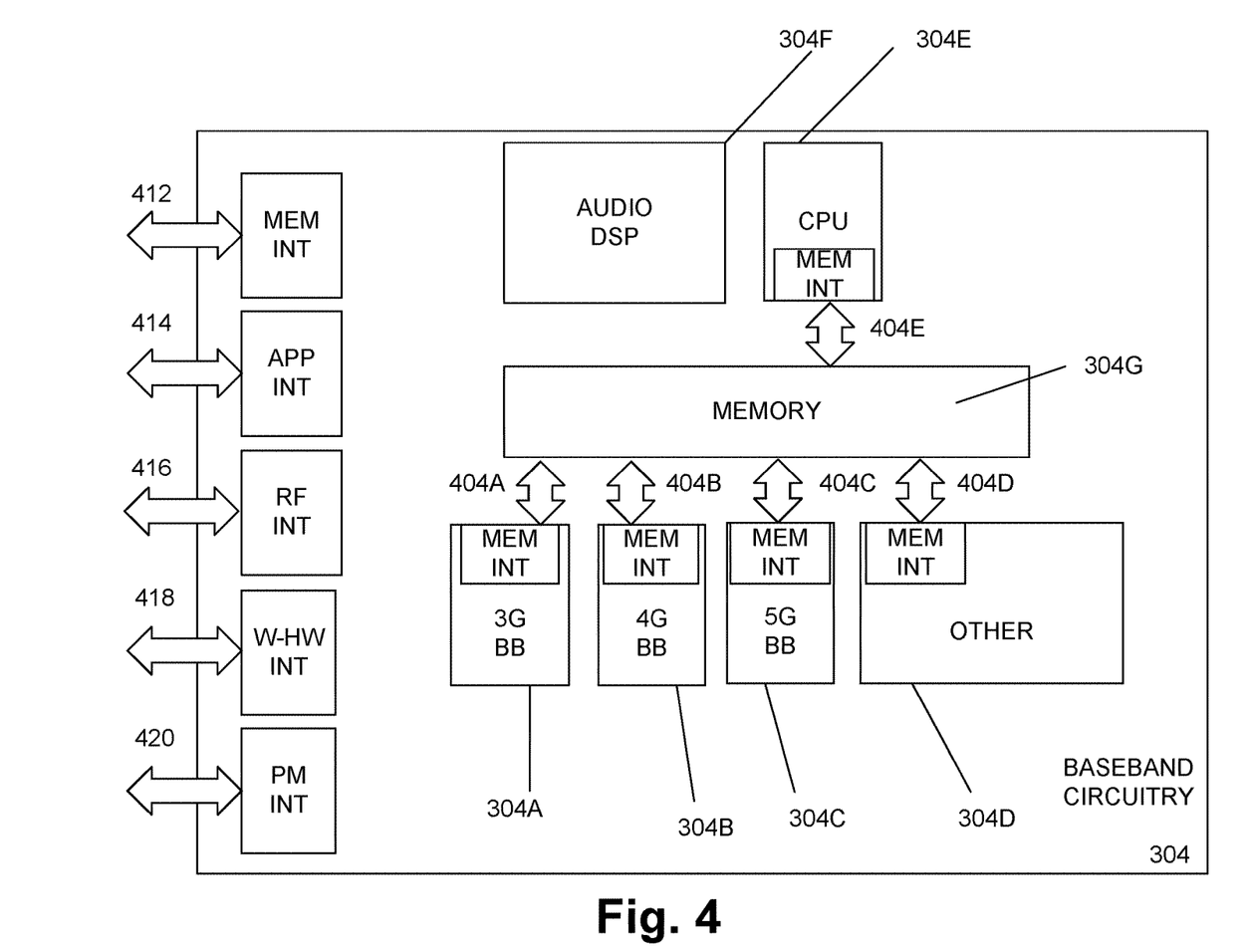
FIG. 4 illustrates example interfaces of baseband circuitry, in accordance with some embodiments of the disclosure.

FIG. 4 illustrates example interfaces of baseband circuitry, in accordance with some embodiments of the disclosure. As discussed above, the baseband circuitry 304 of FIG. 3 may comprise processors 304A-304E and a memory 304G utilized by said processors. Each of the processors 304A-304E may include a memory interface, 404A-404E, respectively, to send/receive data to/from the memory 304G.

The baseband circuitry 304 may further include one or more interfaces to communicatively couple to other circuitries/devices, such as a memory interface 412 (e.g., an interface to send/receive data to/from memory external to the baseband circuitry 304), an application circuitry interface 414 (e.g., an interface to send/receive data to/from the application circuitry 302 of FIG. 3), an RF circuitry interface 416 (e.g., an interface to send/receive data to/from RF circuitry 306 of FIG. 3), a wireless hardware connectivity interface 418 (e.g., an interface to send/receive data to/from Near Field Communication (NFC) components, Bluetooth® components (e.g., Bluetooth® Low Energy), Wi-Fi® components, and other communication components), and a power management interface 420 (e.g., an interface to send/receive power or control signals to/from the PMC 312.

It is pointed out that elements of any of the Figures herein having reference numbers and/or names that correspond with reference numbers and/or names of any other Figure herein may, in various embodiments, operate or function in a manner similar to those corresponding elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A User Equipment (UE) operable to communicate with a base station on a wireless network, comprising:
one or more processors to:
allocate a first set of Resource Elements (REs) for a set of Uplink Control Information (UCI) types, the first set of REs corresponding with a first set of frequency resources;
allocate a second set of REs for the set of UCI types, the second set of REs corresponding with a second set of frequency resources;
allocate a third set of REs for an other set of UCI types, the third set of REs corresponding with the first set of frequency resources;
allocate a fourth set of REs for the other set of UCI types, the fourth set of REs corresponding with the second set of frequency resources; and
prepare one or more Physical Uplink Shared Channel (PUSCH) transmissions comprising the first set of REs, the second set of REs, the third set of REs, and the fourth set of REs, wherein a number of REs in the first set of REs and the third set of REs in the first set of frequency resources is approximately equal to a number of REs in the second set of REs and the fourth set of REs in the second set of frequency resources; and
an interface for sending the PUSCH transmissions to a transmission circuitry.

2. The UE of claim 1, wherein the first set of REs comprises a first number of REs corresponding with a Hybrid Automatic Repeat Request Acknowledgement (HARQ-ACK); and
wherein the second set of REs comprises a second number of REs corresponding with the HARQ-ACK, the second number of REs corresponding with the HARQ-ACK being the same as the first number of REs corresponding with the HARQ-ACK.

3. The UE of claim 2, wherein the first set of REs comprises a first number of REs corresponding with a Channel State Information (CSI) part 1; and
wherein the second set of REs comprises a second number of REs corresponding with the CSI part 1, the second number of REs corresponding with the CSI part 1 being different than the first number of REs corresponding with the CSI part 1.

4. The UE of claim 2, wherein the first set of REs comprises a first number of REs corresponding with a Channel State Information (CSI) part 1;
wherein the second set of REs comprises a second number of REs corresponding with the CSI part 1, the second number of REs corresponding with the CSI part 1 being the same as the first number of REs corresponding with the CSI part 1;
wherein the first set of REs comprises a first number of REs corresponding with a Channel State Information (CSI) part 2; and
wherein the second set of REs comprises a second number of REs corresponding with the CSI part 2, the second number of REs corresponding with the CSI part 2 being different than the first number of REs corresponding with the CSI part 2.

5. The UE of claim 1, wherein the set of UCI types comprises at least one of:
a Hybrid Automatic Repeat Request Acknowledgement (HARQ-ACK), a Channel State Information (CSI) part 1, or a CSI part 2.

6. The UE of claim 1,
wherein a number of REs corresponding with a Channel State Information (CSI) part 1 in the first set of REs is different than a number of REs corresponding with the CSI part 1 in the second set of REs.

7. The UE of claim 1, wherein a number of REs corresponding with a Channel State Information (CSI) part 2 in the first set of REs is different than a number of REs corresponding with the CSI part 2 in the second set of REs.

8. The UE of claim 1, wherein the one or more PUSCH transmissions are within a single slot comprising 14 Orthogonal Frequency Division Multiplexing (OFDM) symbols.

9. The UE of claim 1, wherein the first set of frequency resources corresponds to a first frequency hop; and wherein the second set of frequency resources corresponds to a second frequency hop.

10. Non-transitory machine readable storage media having machine executable instructions that, when executed, cause one or more processors of a User Equipment (UE) operable to communicate with a base station on a wireless network to perform operations comprising:
allocating a first set of Resource Elements (REs) for a set of Uplink Control Information (UCI) types corresponding with a first set of frequency resources;
allocating a second set of REs for the set of UCI types corresponding with a second set of frequency resources;
allocating a third set of REs for an other set of UCI types corresponding with the first set of frequency resources;
allocating a fourth set of REs for the other set of UCI types corresponding with the second set of frequency resources; and
preparing one or more Physical Uplink Shared Channel (PUSCH) transmissions comprising the first set of REs, the second set of REs, the third set of REs, and the fourth set of REs, wherein a number of REs in the first set of REs and the third set of REs in the first set of frequency resources is approximately equal to a number of REs in the second set of REs and the fourth set of REs in the second set of frequency resources.

11. The non-transitory machine readable storage media of claim 10, wherein the first set of REs comprises a first number of REs corresponding with a Hybrid Automatic Repeat Request Acknowledgement (HARQ-ACK);
wherein the second set of REs comprises a second number of REs corresponding with the HARQ-ACK, the second number of REs corresponding with the HARQ-ACK being the same as the first number of REs corresponding with the HARQ-ACK;
wherein the first set of REs comprises a first number of REs corresponding with a Channel State Information (CSI) part 1; and
wherein the second set of REs comprises a second number of REs corresponding with the CSI part 1, the second number of REs corresponding with the CSI part 1 being different than the first number of REs corresponding with the CSI part 1.

12. The non-transitory machine readable storage media of claim 10, wherein the first set of REs comprises a first number of REs corresponding with a Hybrid Automatic Repeat Request Acknowledgement (HARQ-ACK);
wherein the second set of REs comprises a second number of REs corresponding with the HARQ-ACK, the second number of REs corresponding with the HARQ-ACK being the same as the first number of REs corresponding with the HARQ-ACK;

wherein the first set of REs comprises a first number of REs corresponding with a Channel State Information (CSI) part 1;

wherein the second set of REs comprises a second number of REs corresponding with the CSI part 1, the second number of REs corresponding with the CSI part 1 being the same as the first number of REs corresponding with the CSI part 1;

wherein the first set of REs comprises a first number of REs corresponding with a Channel State Information (CSI) part 2; and wherein the second set of REs comprises a second number of REs corresponding with the CSI part 2, the second number of REs corresponding with the CSI part 2 being different than the first number of REs corresponding with the CSI part 2.

13. The non-transitory machine readable storage media of claim 10, wherein the set of UCI types comprises at least one of: a Hybrid Automatic Repeat Request Acknowledgement (HARQ-ACK), a Channel State Information (CSI) part 1, or a CSI part 2.

14. The non-transitory machine readable storage media of claim 10, wherein a number of REs corresponding with a Channel State Information (CSI) part 1 in the first set of REs is different than a number of REs corresponding with the CSI part 1 in the second set of REs.

15. The non-transitory machine readable storage media of claim 10, wherein a number of REs corresponding with a Channel State Information (CSI) part 2 in the first set of REs is different than a number of REs corresponding with the CSI part 2 in the second set of REs.

16. The non-transitory machine readable storage media of claim 10, wherein the one or more PUSCH transmissions are within a single slot comprising 14 Orthogonal Frequency Division Multiplexing (OFDM) symbols;

wherein the first set of frequency resources corresponds to a first frequency hop; and wherein the second set of frequency resources corresponds to a second frequency hop.

17. A User Equipment (UE) comprising an application processor, a memory, one or more antennas, a wireless interface for allowing the application processor to communicate with another device, a touch-screen display, and one or more processors to:

allocate a first set of Resource Elements (REs) for a set of Uplink Control Information (UCI) types corresponding with a first set of frequency resources;

allocate a second set of REs for the set of UCI types corresponding with a second set of frequency resources;

allocate a third set of REs for an other set of UCI types corresponding with the first set of frequency resources;

allocate a fourth set of REs for the other set of UCI types corresponding with the second set of frequency resources; and prepare one or more Physical Uplink Shared Channel (PUSCH) transmissions comprising the first set of REs, the second set of REs, the third set of REs, and the fourth set of REs, wherein a number of REs in the first set of REs and the third set of REs in the first set of frequency resources is approximately equal to a number of REs in the second set of REs and the fourth set of REs in the second set of frequency resources; and an interface for sending the PUSCH transmissions from the one or more processors to a transmission circuitry.

18. The UE of claim 17, wherein the one or more PUSCH transmissions are within a single slot comprising 14 Orthogonal Frequency Division Multiplexing (OFDM) symbols;

wherein the first set of frequency resources corresponds to a first frequency hop;

wherein the second set of frequency resources corresponds to a second frequency hop;

wherein the first set of REs comprises a first number of REs corresponding with a Hybrid Automatic Repeat Request Acknowledgement (HARQ-ACK); and wherein the second set of REs comprises a second number of REs corresponding with the HARQ-ACK, the second number of REs corresponding with the HARQ-ACK being the same as the first number of REs corresponding with the HARQ-ACK.

19. The UE of claim 18, wherein the first set of REs comprises a first number of REs corresponding with a Channel State Information (CSI) part 1; and wherein the second set of REs comprises a second number of REs corresponding with the CSI part 1, the second number of REs corresponding with the CSI part 1 being different than the first number of REs corresponding with the CSI part 1.

20. The UE of claim 18, wherein the first set of REs comprises a first number of REs corresponding with a Channel State Information (CSI) part 1;

wherein the second set of REs comprises a second number of REs corresponding with the CSI part 1, the second number of REs corresponding with the CSI part 1 being the same as the first number of REs corresponding with the CSI part 1;

wherein the first set of REs comprises a first number of REs corresponding with a Channel State Information (CSI) part 2; and wherein the second set of REs comprises a second number of REs corresponding with the CSI part 2, the second number of REs corresponding with the CSI part 2 being different than the first number of REs corresponding with the CSI part 2.

* * * * *